Oct. 10, 1967     K. H. MACHER     3,346,320
HIGH-SPEED VARIFOCAL OBJECTIVE
Filed July 17, 1963
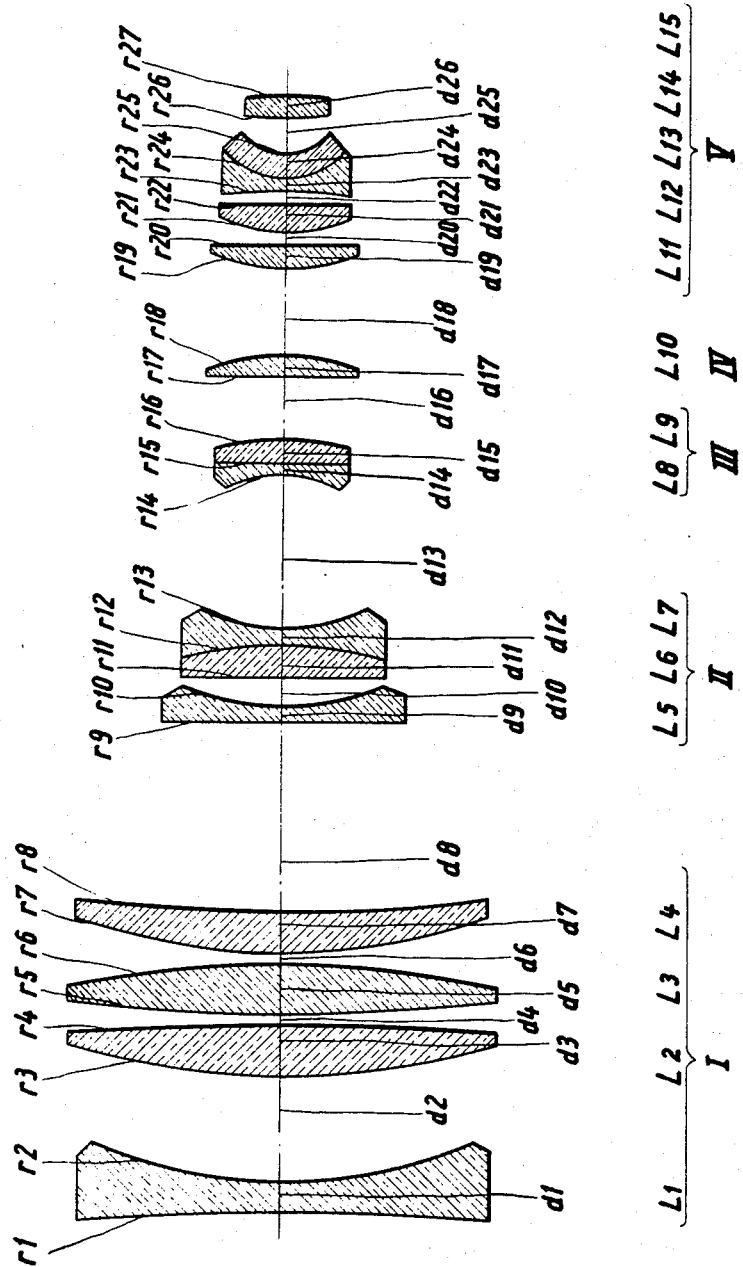
KARL H. MACHER
*Inventor:*
*Karl G. Ross*
AGENT

United States Patent Office 3,346,320
Patented Oct. 10, 1967

3,346,320
HIGH-SPEED VARIFOCAL OBJECTIVE
Karl H. Macher, Bad Kreuznach, Rhineland, Germany, assignor to Jos. Schneider & Co., Bad Kreuznach, Germany, a corporation of Germany
Filed July 17, 1963, Ser. No. 295,851
2 Claims. (Cl. 350—184)

My present invention relates to a varifocal optical objective system for photographic or cinematographic cameras, the system including a fixed rear lens group and an adjustable front lens group of the general type disclosed in commonly assigned copending application Ser. No. 126,306 filed July 24, 1961, by Günter Klemt and me, since abandoned and replaced by application Ser. No. 420,727 filed Dec. 23, 1964, now Patent No. 3,272,073.

One of the systems disclosed in the prior application above referred to has a varifocal ratio of 6:1 and a relative aperture of 1:1.4, corresponding to a focal length ranging between about 40 and 240 mm. in an object of this type.

The general objective of my present invention is to provide a system of this type which, with like frame sizes, operates on shorter overall focal lengths while still maintaining substantially the same large varifocal ratio. An advantage of this shift of the focal range is the increased field angle thereby obtainable.

A more particular object of the invention is to bring about the desired reduction in overall focal length without materially reducing the focal length of the fixed rear lens group constituting, as it were, a basic or principal objective for which the adjustable front lens group acts as a varifocal attachment; a major decrease in the focal length of this rear lens group is often objectionable in that it increases the angle of incidence of slanting rays, thereby necessitating larger lens diameters in the front component of the system, hence the invention aims at obviating this drawback.

Another object of this invention is to provide an objective system of this character which is focusable, without the need for a separate attachment, onto nearby objects (e.g. as close as 1 m. or less) without changes in the back-focal length of the objective, with illumination of the entire field of projection and with only a small adjustment stroke of a limitedly displaceable focusing lens.

An objective system according to the present invention consists of a four-component forward lens group and a four-member rear lens group, the members of the forward lens group including two stationary positively refracting components bracketing two axially movable negatively refracting components as is well known per se; the positive first component of the forward lens group includes a dispersive front lens, which is preferably adjustable, and one or more collective lenses separated from this front lens by an air space whose axial extent is less than one-fourth of the focal length of said first component, this focal length in turn being greater than the individual focal length of the negative front lens.

The collective portion of the first component preferably consists of three air-spaced positive singlets whose confronting surfaces are so dimensioned that the sum of the reciprocal values of the radii of curvature of the surfaces defining the first intervening air space is substantially equal to or less than half the sum of the reciprocal values of the radii of curvature of the surfaces defining the second intervening air space. The effect of this relationship is to minimize the residual aberrations over the entire range of varifocal adjustment.

Owing to the short individual focal length of the negative front lens provided in a system of this description, the adjustment stroke of that front lens is very short even for focusing at close range (e.g. less than 1 m.); at the same time the diameter of this front lens, as also those of the three positive lenses following it, is of only moderate size compared with the total axial length of the system.

The sole figure of the accompanying drawing illustrates an embodiment of my invention.

The system shown in the drawing comprises a four-component varifocal forward lens group I–IV and a fixed-focus four-component rear lens group V. The first component I of the varifocal group comprises a dispersive lens L1 with radii r1, r2 and thickness d1, separated by an air space d2 from an assembly of three closely juxtaposed collective singlets, i.e. a first biconvex lens L2 with radii r3, r4 and thickness d3, a second biconvex lens L3 with radii r5, r6 and thickness d5, and a positive meniscus L4 with radii r7, r8 and thickness d7; the intervening air spaces have been designated d4 and d6. A variable air space d8 separates the positively refracting first component I from the axially shiftable, negatively refracting second component II which consists of a nearly plano-concave lens L5 (radii r9, r10, thickness d9) and a doublet air spaced from lens L5 by a distance d10, this doublet being constituted by a substantially plano-convex lens L6 (radii r11, r12, thickness d11) cemented onto a biconvex lens L7 (radii r12, r13, thickness d12). Another variable air space d13 intervenes between components II and III, the latter being an axially shiftable doublet consisting of a substantially plano-concave lens L8 (radii r14, r15, thickness d14) and a substantially plano-convex lens L9 (radii r15, r16, thickness d15) cemented thereto. The fourth component IV, following component III with a variable spacing d16, is a fixed positive lens L10 of nearly plano-convex configuration having radii r17, r18 and thickness d17.

Component V follows the group I–IV with a spacing d18, the four members of this component being a substantially biconvex lens L11 (radii r19, r20, thickness d19), another positive lens L12 of similar configuration (radii r21, r22, thickness d21) spaced from lens L11 by an air gap d20, a negative doublet composed of a biconcave lens L13 (radii r23, r24, thickness d23) and a concavo-convex lens L14 (radii r24, r25, thickness d24) cemented to it, this doublet being separated from lens L12 by an air space d22, and a biconvex singlet L15 (radii r26, r27, thickness d26) following the doublet L13, L14 with a spacing d25.

Representative numerical values for the radii r1–r27, the thicknesses and air spaces d1–d26, the refractive indices $n_d$ and the Abbé numbers $\nu$ of a system as shown in the drawing, constituting an objective with relative aperture of 1:1.4 and varifocal range of 30 to 180 linear units (e.g. millimeters), are given in the following table:

TABLE

| Lens | Radii | Thicknesses and Separations | $n_d$ | $\nu$ |
|---|---|---|---|---|
| L1 | r1 = −1,339.00 | d1 = 15.00 | 1.78470 | 26.10 |
|    | r2 = +249.80 | d2 = 56.50 | Air space | |
| L2 | r3 = +385.40 | d3 = 30.00 | 1.69938 | 49.57 |
|    | r4 = −1,434.00 | d4 = 0.90 | Air space | |
| L3 | r5 = +1,025.00 | d5 = 25.75 | 1.67790 | 55.52 |
|    | r6 = −537.20 | d6 = 1.35 | Air space | |
| L4 | r7 = +308.80 | d7 = 22.50 | 1.67790 | 55.52 |
|    | r8 = +980.75 | | | |

TABLE—Continued

| Lens | | Radii | Thicknesses and Separations | $n_d$ | $\nu$ |
|---|---|---|---|---|---|
| II | L5 | $r9 = +10,000.00$ | $d8 = 155.70$ | | Variable air space |
| | | $r10 = +139.75$ | $d9 = 7.50$ | 1.62041 | 60.29 |
| | | | $d10 = 15.50$ | | Air space |
| | L6 | $r11 = -1,502.00$ | $d11 = 17.00$ | 1.80518 | 25.46 |
| | L7 | $r12 = -160.70$ | $d12 = 5.00$ | 1.52542 | 64.55 |
| | | $r13 = +92.75$ | $d13 = 34.80$ | | Variable air space |
| III | L8 | $r14 = -66.00$ | $d14 = 4.00$ | 1.62041 | 60.29 |
| | L9 | $r15 = +872.75$ | $d15 = 10.50$ | 1.64831 | 33.77 |
| | | $r16 = -168.25$ | $d16 = 30.00$ | | Variable air space |
| IV | L10 | $r17 = +1,002.00$ | $d17 = 11.00$ | 1.65844 | 50.84 |
| | | $r18 = -126.25$ | $d18 = 38.00$ | | Air space |
| V | L11 | $r19 = +102.80$ | $d19 = 10.75$ | 1.71300 | 53.89 |
| | | $r20 = +1,087.00$ | $d20 = 0.50$ | | Air space |
| | L12 | $r21 = +62.95$ | $d21 = 17.00$ | 1.71300 | 53.89 |
| | | $r22 = +1,169.50$ | $d22 = 1.50$ | | Air space |
| | L13 | $r23 = -475.00$ | $d23 = 7.75$ | 1.80518 | 25.46 |
| | L14 | $r24 = +38.93$ | $d24 = 15.00$ | 1.71300 | 53.89 |
| | | $r25 = +40.83$ | $d25 = 16.25$ | | Air space |
| | L15 | $r26 = +100.50$ | $d26 = 10.75$ | 1.71300 | 53.89 |
| | | $r27 = -124.65$ | | | |

The front lens L1 has an individual focal length $f_{L1} = 265$ whose absolute value is less than that of the focal length $f_I = +295$ of the front component I. It will be noted that the latter focal length $f_I$ is more than four times as large as the air space $d2$ separating lens L1 from the next lens L2, the extent of this space in the normal position of adjustment of lens L1 (i.e. with focus at infinity) being 56.5 linear units.

The values given in the foregoing table also satisfy the relationship $$2\left(\left|\frac{1}{r4}\right|+\left|\frac{2}{r5}\right|\right) \leq \left(\left|\frac{1}{r6}\right|+\left|\frac{1}{r7}\right|\right)$$

which is to be observed for the suppression of residual aberrations, $r4$ and $r5$ being the radii of curvature of lens faces bounding the air space $d4$ whereas $r6$ and $r7$ are the radii of the correspondent lens faces adjoining the air space $d6$. The magnitudes of the variable air spaces $d8$, $d13$ and $d16$ given in the table, corresponding to the lens positions shown in the drawing, represent an adjustment to an intermediate overall focal length $f=100$. For the minimum focal length $f=30$, the numerical values of these air spaces will be $d8 = 9.25$
$d13 = 187.40$
$d16 = 23.85$ for the maximum focal length $f=180$, these values will be $d8 = 200.60$
$d13 = 14.70$
$d16 = 5.20$

I claim:

1. In an optical objective system including a fixed-focus rear lens group, the combination therewith of a forward lens group consisting of a substantially fixed positive first component, a negative second component, a negative third component and a fixed positive fourth component; said first component including three air-spaced positive singlets and a dispersive front lens preceding said singlets, said front lens being air-spaced from the next one of said singlets by a distance less than substantially one-fourth of the focal length of said first component, said front lens having an individual focal length whose absolute value is less than that of the focal length of said first component; said second and third components being movable, relatively to each other and to said first and fourth components, into a first position in which the system has a relatively small focal length, an intermediate second position, and a third position in which said system has a relatively large focal length, said second component consisting of a negative singlet followed by a negative doublet, said third component being a negative doublet; the numerical values of the radii of curvature $r1$ to $r18$ of said dispersive front lens L1, said collective singlets L2, L3, L4, said negative singlet L5 of said second component, said doublet L6, L7 of said negative second component, said doublet L8, L9 of said third component and a positive singlet L10 constituting said fourth component, and of the axial thicknesses and separations $d1$ to $d17$ thereof, based upon a numerical value of 100 for an intermediate overall focal length of the system, the refractive indices $n_d$ of said lenses and their Abbé numbers $\nu$ being substantially as given in the following table, the spaces $d8$, $d13$ and $d16$ being given for that second position:

TABLE

| Lens | | Radii | Thicknesses and Separations | $n_d$ | $\nu$ |
|---|---|---|---|---|---|
| I | L1 | $r1 = -1,339.00$ | $d1 = 15.00$ | 1.78470 | 26.10 |
| | | $r2 = +249.80$ | $d2 = 56.50$ | | Air space |
| | L2 | $r3 = +335.40$ | $d3 = 30.00$ | 1.69933 | 49.57 |
| | | $r4 = -1,434.00$ | $d4 = 0.90$ | | Air space |
| | L3 | $r5 = +1,025.00$ | $d5 = 25.75$ | 1.67790 | 55.52 |
| | | $r6 = -537.20$ | $d6 = 1.35$ | | Air space |
| | L4 | $r7 = +308.80$ | $d7 = 22.50$ | 1.67790 | 55.52 |
| | | $r8 = +980.75$ | $d8 = 155.70$ | | Air space |
| II | L5 | $r9 = +10,000.00$ | $d9 = 7.50$ | 1.62041 | 60.29 |
| | | $r10 = +139.75$ | $d10 = 15.50$ | | Air space |
| | L6 | $r11 = -1,502.00$ | $d11 = 17.00$ | 1.80518 | 25.46 |
| | L7 | $r12 = -160.70$ | $d12 = 5.00$ | 1.52542 | 64.55 |
| | | $r13 = +92.75$ | $d13 = 34.80$ | | Air space |
| III | L8 | $r14 = -66.00$ | $d14 = 4.00$ | 1.62041 | 60.29 |
| | L9 | $r15 = +872.75$ | $d15 = 10.50$ | 1.64831 | 33.77 |
| | | $r16 = -168.25$ | $d16 = 30.00$ | | Air space |
| IV | L10 | $r17 = +1,002.00$ | $d17 = 11.00$ | 1.65844 | 50.84 |
| | | $r18 = -126.25$ | | | |

2. An optical objective system comprising a rear lens group consisting of four fixed air-spaced lens members and a forward lens group consisting of a substantially fixed positive first component, a negative second component, a negative third component and a fixed positive fourth component; said first component including three air-spaced positive singlets and a dispersive front lens preceding said singlets, said front lens being air-spaced from the next one of said singlets by a distance less than substantially one-fourth of the focal length of said first component, said front lens having an individual focal length whose absolute value is less than that of the focal length of said first component; said second and third components being movable, relatively to each other and to said first and fourth components, into a first position in which the system has a relatively small focal length, an intermediate second position, and a third position in which said system has a relatively large focal length, said second component consisting of a negative singlet followed by a negative doublet, said third component being a negative doublet, said rear lens group consisting of a first positive lens member, a second positive lens member, a cemented negative lens member and a third positive lens member all air-spaced from one another; the numerical values of the radii of curvature $r1$ to $r27$ of said dispersive front lens L1, said collective singlets L2, L3, L4, said negative singlet L5 of said second component, said doublet L6, L7 of said negative second component, said doublet L8, L9 of said third component, a positive singlet L10 constituting said fourth component, the first positive lens member L11 of said rear group, the second positive lens member L12 of said rear group, the cemented lens member L13, L14 of said rear group and the third positive lens member L15 of said rear group, and of the axial thicknesses and separations $d1$ to $d26$ thereof, based upon a numerical value of 100 for an intermediate overall focal length of the system, the refractive indices $n_d$ of said lenses and their Abbé numbers $\nu$ being substantially as given in the following table, the spaces $d8$, $d13$ and $d16$ being given for said second position:

TABLE

|   | Lens | Radii | Thicknesses and Separations | $n_d$ | $\nu$ |
|---|---|---|---|---|---|
| I | L1 | $r1 = -1,339.00$<br>$r2 = +249.80$ | $d1 = 15.00$ | 1.78470 | 26.10 |
|   |    |   | $d2 = 56.50$ | Air space | |
|   | L2 | $r3 = +385.40$<br>$r4 = -1,434.00$ | $d3 = 30.00$ | 1.69938 | 49.57 |
|   |    |   | $d4 = 0.90$ | Air space | |
|   | L3 | $r5 = +1,025.00$<br>$r6 = -537.20$ | $d5 = 25.75$ | 1.67790 | 55.52 |
|   |    |   | $d6 = 1.35$ | Air space | |
|   | L4 | $r7 = +308.80$<br>$r8 = +980.75$ | $d7 = 22.50$ | 1.67790 | 55.52 |
|   |    |   | $d8 = 155.70$ | Air space | |
| II | L5 | $r9 = +10,000.00$<br>$r10 = +139.75$ | $d9 = 7.50$ | 1.62041 | 60.29 |
|   |    |   | $d10 = 15.50$ | Air space | |
|   | L6<br>L7 | $r11 = -1,502.00$<br>$r12 = -160.70$<br>$r13 = +92.75$ | $d11 = 17.00$<br>$d12 = 5.00$ | 1.80518<br>1.52542 | 25.46<br>64.55 |
| III | L8<br>L9 | $r14 = -66.00$<br>$r15 = +872.75$<br>$r16 = -168.25$ | $d13 = 34.80$<br>$d14 = 4.00$<br>$d15 = 10.50$ | Air space<br>1.62041<br>1.64831 | 60.29<br>33.77 |
|   |    |   | $d16 = 30.00$ | Air space | |
| IV | L10 | $r17 = +1,002.00$<br>$r18 = -126.25$ | $d17 = 11.00$ | 1.65844 | 50.84 |
|   |    |   | $d18 = 38.00$ | Air space | |
| V | L11 | $r19 = +102.80$<br>$r20 = +1,087.00$ | $d19 = 10.75$ | 1.71300 | 53.89 |
|   |    |   | $d20 = 0.50$ | Air space | |
|   | L12 | $r21 = +62.95$<br>$r22 = +1,169.50$ | $d21 = 17.00$ | 1.71300 | 53.89 |
|   |    |   | $d22 = 1.50$ | Air space | |
|   | L13<br>L14 | $r23 = -475.00$<br>$r24 = +38.93$<br>$r25 = +40.83$ | $d23 = 7.75$<br>$d24 = 15.00$ | 1.80518<br>1.71300 | 25.46<br>53.89 |
|   |    |   | $d25 = 16.25$ | Air space | |
|   | L15 | $r26 = +100.50$<br>$r27 = -124.65$ | $d26 = 10.75$ | 1.71300 | 53.89 |

References Cited

UNITED STATES PATENTS 3,272,073  9/1966  Klemt et al. _____ 88—57

FOREIGN PATENTS 1,247,678  10/1960  France.
1,309,648  10/1962  France.
1,311,131  10/1962  France.

JEWELL H. PEDERSEN, *Primary Examiner.*

R. J. STERN, *Assistant Examiner.*